(12) United States Patent
Rabenhorst

(10) Patent No.: US 6,384,847 B1
(45) Date of Patent: May 7, 2002

(54) INTERACTIVE GRAPHICAL METHOD FOR ANALYZING MANY-DIMENSIONAL DATA SETS

(75) Inventor: David Alan Rabenhorst, Woodcliff Lake, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 07/854,921

(22) Filed: Mar. 20, 1992

(51) Int. Cl.[7] .............................................. G06F 3/037
(52) U.S. Cl. ........................ 345/804; 345/805; 345/764; 345/853
(58) Field of Search ................................ 395/155, 140, 395/131, 161; 345/115, 119, 133, 150, 804, 805, 440, 764, 780, 781, 810, 835, 845, 853; 364/554, 937.5, 224.1, 224.2

(56) References Cited

U.S. PATENT DOCUMENTS

| | | | |
|---|---|---|---|
| 3,851,156 A | 11/1974 | Green ...................... 235/151.3 |
| 4,648,028 A | 3/1987 | DeKlotz et al. ............ 364/188 |
| 4,685,070 A | 8/1987 | Flinchbaugh ............... 364/522 |
| 4,808,988 A | 2/1989 | Burke et al. ................ 340/744 |
| 4,845,653 A | 7/1989 | Conrad et al. .............. 364/521 |
| 4,875,034 A | 10/1989 | Brokenshire ................ 340/721 |
| 4,958,301 A | 9/1990 | Kobayashi ................... 364/521 |
| 5,043,920 A | 8/1991 | Malm et al. ................. 364/521 |
| 5,053,710 A | 10/1991 | Schlereth .................... 324/309 |
| 5,175,710 A | * 12/1992 | Hutson ........................ 367/135 |
| 5,179,643 A | * 1/1993 | Homma et al. ............. 395/140 |
| 5,228,119 A | * 7/1993 | Mihalisin et al. ........... 345/418 |
| 5,257,349 A | * 10/1993 | Alexander ................... 395/159 |
| RE36,840 E | * 8/2000 | Mihalisin et al. ........... 345/418 |

FOREIGN PATENT DOCUMENTS

| | | |
|---|---|---|
| EP | 443531 | 8/1991 |
| JP | 60171575 | 9/1985 |
| JP | 2310775 | * 5/1989 |

OTHER PUBLICATIONS

"Correspondence Visualization Tech. for Analyzing and Eval. Software Meas." IEEE Trans. on Software Eng, Ebert, C., pp 1029–34, Nov. 1992.*

"Visualizing Multivariate Functions, Data, and Distributions", IEEE Computer Graphics & Allns., vol. 11, 155–3, p28–35, Mihalisin et al., May 1991.*

"Visualization and Analysis of Multi–Variate Data: A Technique for All Fields", Mihalisin et al., Oct. 25, 1991.*

"Visualization in Scientific and Engineering Computation", Nielson, Computer, Sep. 1991.*

IBM TDB Aug., 1990, vol. 33, pp. 202–204, (UK889–0238).

(List continued on next page.)

*Primary Examiner*—Matthew Kim
*Assistant Examiner*—Stephen Elmore
(74) *Attorney, Agent, or Firm*—Louis J. Percello

(57) ABSTRACT

Visually analyzing, selecting, manipulating, displaying, and exploring relationships among variables in data bases with a large number of variables is enables by visualization of pictorial presentations, usually scatter plots. Each scatter plot shows the relationship among some subset of variables in the database. The scatter plots are mutually coupled to one another so that any mathematical transformation of an independent variable in one plot causes changes in other plots with dependent variables according to the relationship between the changed independent variable and the dependent variable. The mutual coupling also applies to color selection and performing logical operations with color on the plots. The plots can access other subsidiary presentations by using specified access criteria. Subsidiary presentations also can access other presentations. All presentations are mutually coupled.

23 Claims, 15 Drawing Sheets

OTHER PUBLICATIONS

"Dynamic Graphics For Statistics", by W.S. Cleveland and Maryland E. McGill Wadsworth & Brooks/Cole Advanced Books & Software, 1988, pp. 14–21.

MacSpin 2.0 User Manual, 1989, D–Squared Software, Chapters 4–7 pp. 45–125.

R.A. Becker et al, "Dynamic Graphics For Data Analysis", Dynamic Graphics for Statistics, pp. 1–50, 1988.

W. Stuetzle, "Plot Windows", Dynamic Graphics for Statistics, Chapter 9, pp. 225–245, 1988.

R.A. Becker et al, "The Use of Brushing and Rotation for Data Analysis", Dynamic Graphics for Statistics, Chapter 10, pp. 247–275, 1988.

* cited by examiner

FIG. 1

| Year | GNP | BCD | PDE | RTG | UNR | DJI | RFF | HS |
|---|---|---|---|---|---|---|---|---|
| 1967 | 2241 | 73 | 138 | 4.4 | 3.90 | 830 | 4.94 | 1.06 |
| 1968 | 2327 | 78 | 146 | 5.1 | 3.70 | 884 | 4.59 | 1.38 |
| 1969 | 2416 | 83 | 156 | 5.7 | 3.40 | 934 | 6.30 | 1.76 |
| 1970 | 2408 | 78 | 154 | 6.8 | 3.90 | 782 | 8.97 | 1.08 |
| 1971 | 2478 | 79 | 148 | 5.9 | 5.90 | 849 | 4.13 | 1.82 |
| 1972 | 2545 | 88 | 159 | 5.6 | 5.80 | 904 | 3.50 | 2.49 |
| 1973 | 2734 | 97 | 191 | 5.9 | 4.90 | 1027 | 5.94 | 2.48 |
| 1974 | 2747 | 95 | 205 | 6.5 | 5.09 | 857 | 9.64 | 1.45 |
| 1975 | 2642 | 78 | 180 | 6.6 | 8.10 | 659 | 7.13 | 1.03 |
| 1976 | 2804 | 92 | 181 | 6.9 | 7.90 | 929 | 4.86 | 1.36 |
| 1977 | 2896 | 98 | 207 | 6.6 | 7.50 | 970 | 4.61 | 1.52 |
| 1978 | 3020 | 101 | 228 | 7.5 | 6.40 | 781 | 6.69 | 1.71 |
| 1979 | 3181 | 105 | 260 | 8.4 | 5.90 | 837 | 10.06 | 1.63 |
| 1980 | 3233 | 101 | 257 | 10.0 | 6.30 | 860 | 13.81 | 1.34 |
| 1981 | 3261 | 102 | 245 | 11.6 | 7.50 | 962 | 19.07 | 1.54 |
| 1982 | 3170 | 97 | 235 | 13.7 | 8.60 | 853 | 13.22 | 0.84 |
| 1983 | 3186 | 106 | 213 | 10.3 | 10.39 | 1064 | 8.68 | 1.58 |
| 1984 | 3451 | 123 | 263 | 11.2 | 8.00 | 1258 | 9.56 | 1.89 |
| 1985 | 3577 | 121 | 297 | 11.1 | 7.30 | 1238 | 8.35 | 1.71 |
| 1986 | 3721 | 128 | 304 | 9.5 | 6.69 | 1534 | 8.14 | 1.97 |
| 1987 | 3781 | 136 | 309 | 7.5 | 6.59 | 2065 | 6.42 | 1.77 |
| 1988 | 3970 | 139 | 353 | 8.8 | 5.69 | 1947 | 6.82 | 1.27 |
| 1989 | 4095 | 145 | 374 | 9.0 | 5.40 | 2234 | 9.11 | 1.57 |
| 1990 | 4150 | 145 | 390 | 8.3 | 5.30 | 2679 | 8.22 | 1.54 |
| 1991 | 4124 | 138 | 383 | 8.3 | 6.19 | 2587 | 6.90 | 0.84 |

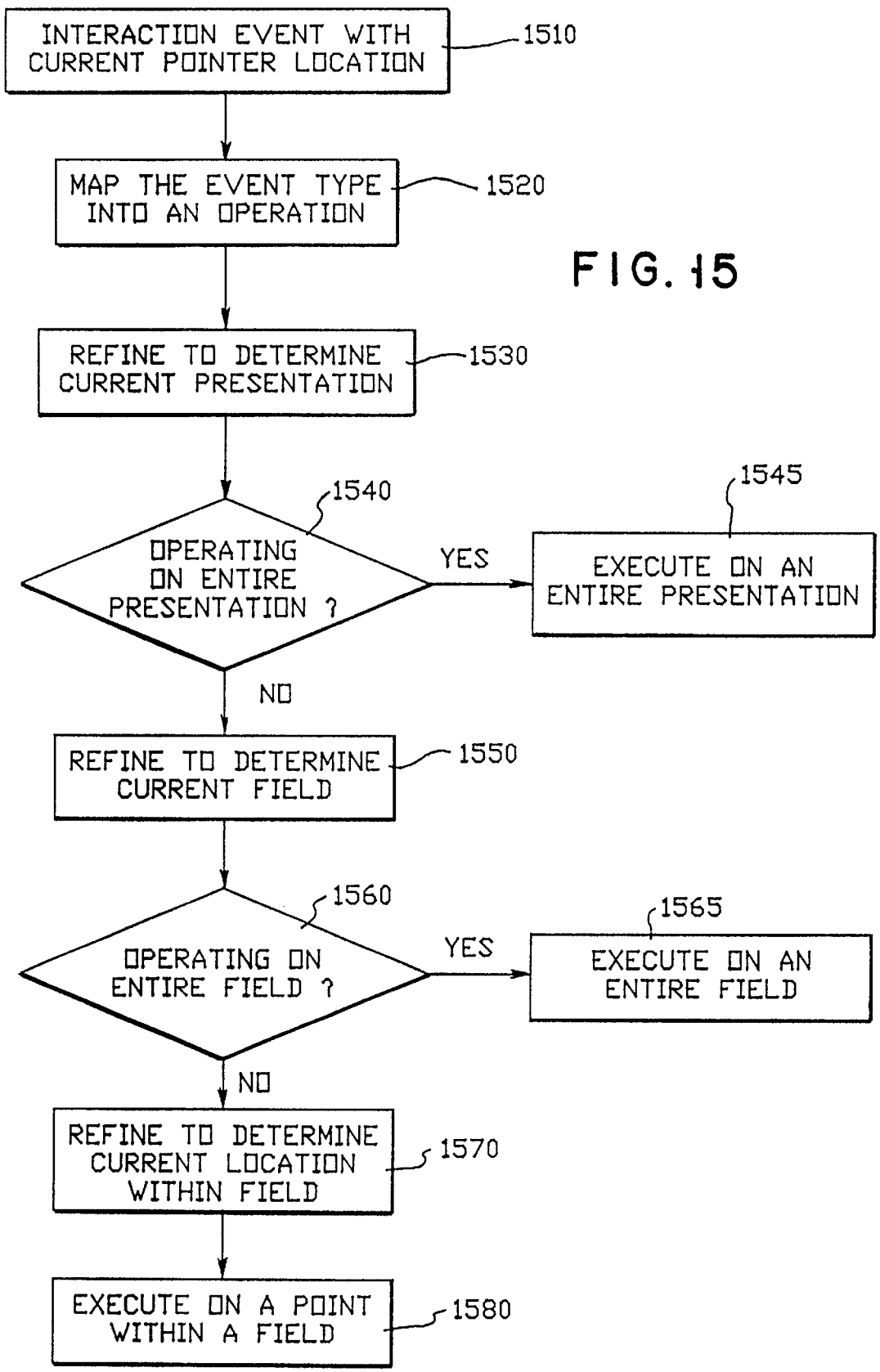

INTERACTIVE GRAPHICAL METHOD FOR ANALYZING MANY-DIMENSIONAL DATA SETS

BACKGROUND OF THE INVENTION

1. Field of the Invention

This invention relates to analysis of multi-dimensional data bases. Specifically, the invention uses interactive graphic displays to explore relationships among variables in a multi-dimensional database.

2. Description of the Prior Art

Data in its raw form, i.e., as a list or table of numbers can be uninteresting and difficult to interpret. To make data more understandable, and in particular, to show relationships between data, many alternative methods of presenting data are used. These methods typically include graphs, charts, and other presentation methods common in the art.

As the amount of data to be presented becomes larger, it often becomes increasingly difficult to present the data in a meaningful way. These difficulties are compounded if the data is many-dimensional i.e., has a large number of variables.

A variable can be thought of as vector or observed points. A set of variables can be thought of as a table of numbers or other tokens (a blank delimited sequence of characters—a number and/or a word) where each column is a vector variable. Each row or record of the table is a set of related observations.

Data with a low number of variables can be visually presented and analyzed easily. As an example, data from a table representing two variables, e.g., length and width, can be easily graphed on a two dimensional plot just as data with three variables, e.g., length, width, and height, can be easily graphed on a three dimensional plot. The prior art can even present data with some limited number of additional variables/dimensions, e.g., temperature and motion, by adding color and/or animation to a three dimensional presentation.

The prior art has attempted to display presentations of large amounts of data with a large number or variables. However, many of these presentations showing larger numbers of data variables, if they are possible to compose at all, become difficult or impossible to interpret, Cleveland and McGill in *Dynamic Graphics for Statistics* use an array of scatter plots to show the relationship among N variables in a data set. (A scatter plot is a graph of the values of one variable plotted against the values of another.) The elements of the array are scatter plots which show the relation between two of the variables. The two variables in each scatter plot are determined by the location of the plot in the array. The array has a scatter plot for every permutation of two variables that is represented in the array.

Cleveland and McGill use one or more colors to select certain points, called subsets. From the total number of points in the data base. Using a technique called brushing, certain points are "painted" a specific color because these points satisfy a certain condition. In addition, every point in the array representing any of the painted points is also painted the same color. By using a single color, the prior art specifics a subset of observations which may show relationships among variables. The prior art also uses multiple colors on one presentation to show multiple subsets of observations which may show additional relationships among variables. Cleveland and McGill further show subsidiary displays which are coupled only in one direction, i.e., from a first display to a second, by not vice versa.

3. Problems with the Prior Art

Even with all its attempts to present data in a meaningful way, the prior art has a number of failings in dealing with data with a large number of variables.

The prior art is not versatile enough to allow efficient exploration of selected subsets of data. Brushing may show that there is some relationship among a certain selected subset of points, but further analysis than this is not shown in the prior art. The prior art does not disclose efficient methods for finding out what different relationships the subset of points has with other data or what relationship exists between variables. The prior art data presentations do not allow the user to easily generate many alternative presentations by selecting a variety of presentation attributes from among a variety of presentations. The prior art also does not allow a user to query the data from the many different perspectives that can be shown in alternate presentations.

The prior art does not offer a rich variety of presentations or presentation types which are mutually coupled together and which are mutually accessible from one another. Without this multi-directional coupling of many diverse presentations and presentation types, it is difficult to organize the data and to identify relationships among variables.

The prior art also does not permit multiple independent uses of color on coupled presentations to visually show combinations of variable conditions.

OBJECTIVES OF THE INVENTION

It is an objective of this invention to provide an improved method and apparatus for presenting multi-dimensional data and exploring relationships among the many variables of the data.

It is an objective of this invention to provide an improved method and apparatus for presenting and exploring data by using the array of visual presentations of the data variables as a directory to access a plurality of subsidiary presentations of data used to present, organize, select, and condition data relationships.

It is another objective of this invention to provide an improved method and apparatus for presenting and exploring data by using multiple independent, and coupled data presentations.

It is another objective of this invention to provide an improved method and apparatus for using color to illustrate the effect of logical operations and transformation performed on the variables of a database.

BRIEF DESCRIPTION OF THE DRAWINGS

FIG. 1 shows a prior art example of part of a multi-dimensional data set.

FIG. 15 shows how user interactions invoke system operations in one embodiment of the invention.

SUMMARY OF THE INVENTION

Figure 2:
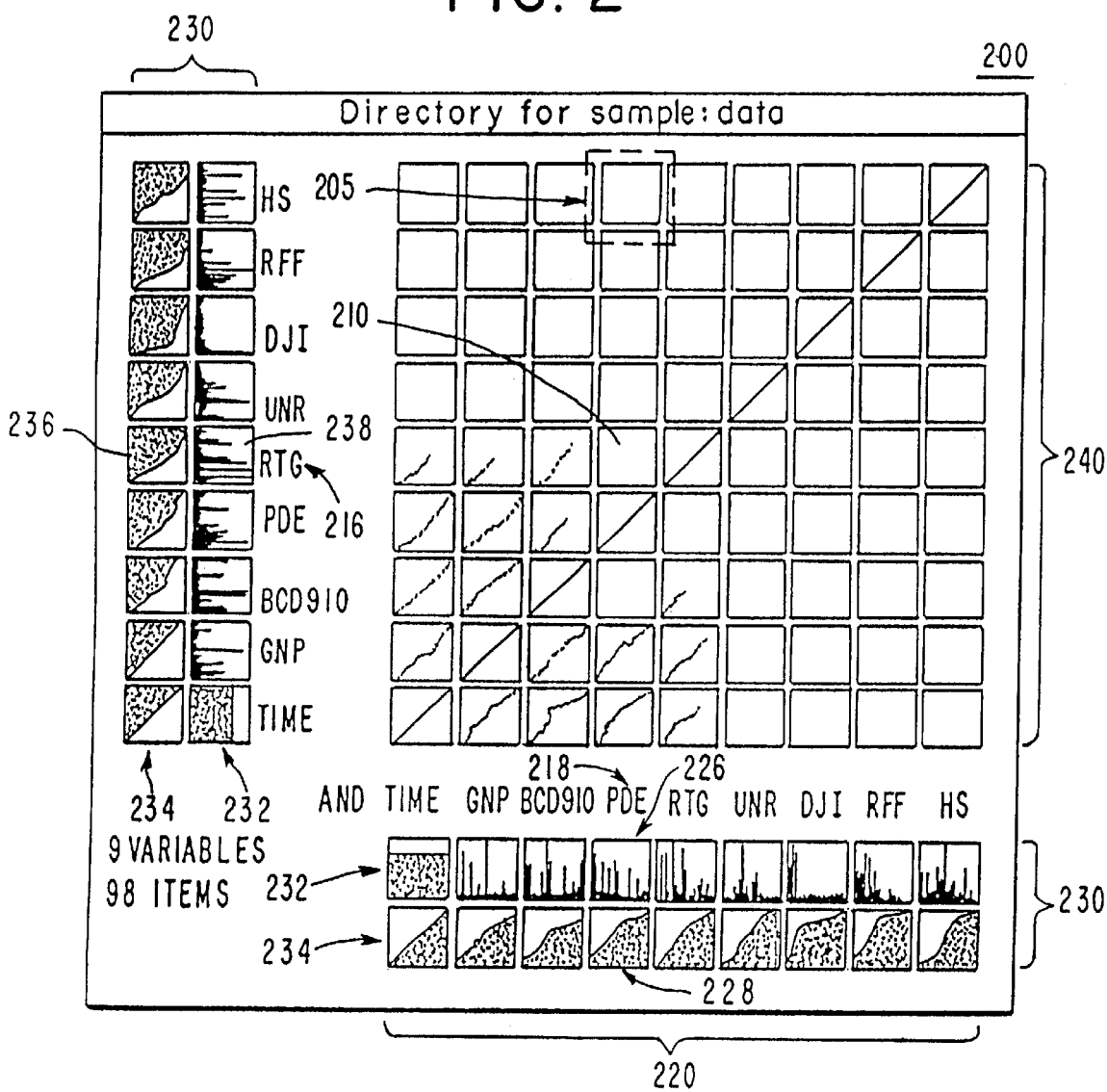
FIG. 2 shows an example of a display of an array of presentations as one embodiment of the present invention.

The present invention discloses an interactive main display presentation which can access a plurality of other mutually coupled presentations. The main display comprises an array of smaller pictorial presentations each of which displays a relationship between two or more variables in the data base. The main display array may also have presentations of the variables themselves and/or some function of these variables.

The main display array presentation provides a concise global view of the entire data base and the current set of transformations and imposed conditions, while alternative presentations, called subsidiary presentations, provide more detailed and specialized perspectives of the data base. By using the main display array as a directory, a user can bring up a plurality of subsidiary presentations showing a selected subset or subsets or data in various formats, such as: plots with different scaling, plots against other variables, plots using the variable in different mathematical functions, charts, graphs etc.

The invention also provides access to different presentations from other presentations. Subsidiary presentations can be derived from a first subsidiary presentation i.e., a child, grandchild, great grandchild, etc.—the first subsidiary presentation progeny. Alternatively, subsidiary presentations can be those from which the accessing subsidiary presentation was derived, i.e., a parent, grandparent, etc.— presentation ancestry. Typically a subsidiary presentation can access its ancestry, its progeny, other subsidiary presentations, and the ancestry and progeny of other subsidiary presentations and visa versa.

The present invention further provides mutual coupling among the variables in the same or different presentations. Variables in the main display array presentation are mutually coupled to variables in the subsidiary presentations. Similarly, variables in different subsidiary presentations are mutually coupled to each other. Additionally, variables in a given presentation (main array or subsidiary) are coupled to other variables in that same presentation.

Coupling occurs if a relationship exists between displayed variables, points, or other information, either within the same presentation, or in different presentations. Relationships may exist between one variable and another ,e.g., one variable may be dependent on the other. If two variables ire related, a change in the first will cause a change in the second according the relationship between them. If the variables are related, a change in the second variable also causes a change in the first according to the relationship.

The present invention allows a user to apply a myriad of logical mathematical operations to data displayed in the main display array and multiple subsidiary presentations. Mutual coupling among the variables of the data causes the effects of these operations to show in all presentations containing variables related to the changed variables. Color can be used to further visualize these effects. By accessing subsidiary presentations, the main display array presentation, and the smaller presentations shown on these presentations, a user can easily explore, determine, and display the relationships among data in large multi-dimensional databases.

DETAILED DESCRIPTION OF THE INVENTION

FIG. 1 shows an example of part of a multi-dimensional data set. It is a table of numbers 110, each of which is an observed data point, typically 115. Each column 120 of the table is a variable, which is also called a set or vector 120 of observed data points. The top row shows the names of the variables 130. Every other row or record 140 of the table 110 is a set of related observations, one for each variable 120.

A user might want to explore this data set to determine if there are any relationships among the variables, and if any relationships exist, to determine the nature of the relationship. A relationship typically exists if one variable changes with respect to another. A direct dependency relationship occurs if one dependent variable changes in some way as an independent variable changes. An indirect dependency relationship occurs if a second dependent variable changes as a first dependent variable changes. If a second dependent variable depends on a first dependent variable which then depends on an independent variable, the second variable is directly dependent on the first dependent variable and indirectly dependent on the independent variable. These relationships can similarly continue to a third, forth or further levels of dependency (relationship). Furthermore these relationships among variables can be linear or nonlinear. A variable may also depend on more than one variable, with each dependency having its own particular relationship. Many of these dependencies are often "hidden", i.e., very difficult, to determine, especially for databases with a large number of variables.

FIG. 2 shows ail example of an array of presentations 200, used as the main display array presentation of the preferred embodiment. (Note that in other embodiments the presentation does not have to be visual. An auditory or tactile presentation can also be used to convey information to a user.) The rows 240 and columns 220 of the army correspond to the variables of the data 230, i.e., the variables named 130 in FIG. 1. (The columns of FIG. 1 only show part of the data base that is portrayed in the presentations.) For added flexibility and to facilitate data exploration, the rows and columns of the main array presentation may be independently sorted in a variety of ways, including being sorted in relation to a particular statistic.

Figure 2A:
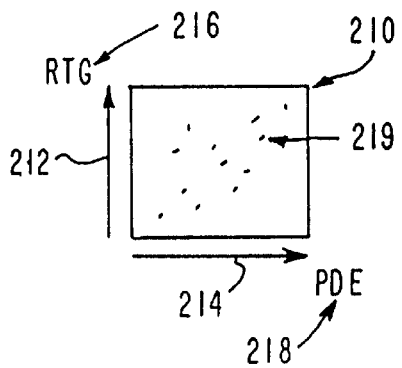
FIG. 2A shows one preferred representation, a scatter plot, displayed by the invention.

The elements of the array are smaller presentations (typically 205), in the preferred embodiment, two-dimensional scatter plots. The axes 212 and 214 of a selected scatter plot 210 are determined by the position of the scatter plot element in the array, i.e., the row variable 216 on the vertical axis of the plot 212 and the column variable 218 on the horizontal axis 214 of the scatter plot (or visa versa). See enlarged scatter plot 210 in FIG. 2A. Each scatter plot is a pictorial presentation showing the relationship of a permutation of two variables (216 and 218) of the data, with one variable plotted against the other, and with each observed data point corresponding to a point in each scatter plot 219. As an example, in the year 1975 shown on row 119 of FIG. 1, the value of PDE is 180 and the value of RTG is 6.6. These values represent the abscissa and ordinate of one observed data point 219 on scatter plot 210 in FIG. 2. Other points on the plot are derived similarly. The ranges of the variables in each scatter plot are normalized so as to cover the same plot area.

Along the left and bottom edges of the main display array presentation 200 are one-dimensional histograms 232 and cumulative histograms 234, each showing the frequency distribution of observed data points in a single variable, typically 216 or 218. A histogram is a bar graph of a variable showing the distribution of values throughout the range. A cumulative histogram is the integral of the histogram. These presentations are well known in the prior art. To produce a histogram, the entire range of data point values of the variable is partitioned into a number of slots or buckets of equal sub-ranges, and the populations of data points falling into each slot is counted. A rectangular bar is plotted for each slot, and the slot populations are mapped to the bar lengths. The length of the bars in each histogram is normalized so the longest bar in each plot covers the same plot area. Cumulative histograms, or quantile plots, depict the rough proportion of values of a single variable below a particular value.

Transformations are performed and changes to variables are made using input apparatus well known in the art, e.g., a mouse, keyboard cursor controls, and light pens.

Selected mathematical operations, also called transforms or scaling functions, can be performed on the variables shown in the main display array presentation 200. In the preferred embodiment, these scaling functions may be applied by pressing on of a set of scaling function keys while pointing to the variable or variables to which the function will be applied. Some examples of scaling functions and selecting keys are: identity (i key), square root (s key), square (S key), logarithm (l key), exponential (e key), and negative (N key). A single variable may be selected for scaling by pointing the apparatus at the representation for a single variable (e.g., a histogram or cumulative histogram). Two variables may be selected for scaling by pointing the pointing apparatus at the representation for two variables (e.g., a scatter plot). All variables may be selected by pointing the pointing apparatus at the representation for no variables (e.g., outside all plots.) It will be understood that these methods of pointing and selecting are used as illustrations and that any pointing and selecting method known in the art is contemplated for the practice of this invention.

Conditioning, or color coding subsets of data points, can be performed on the variables shown in the main display array presentation 200. These conditioning operations may he applied by pressing one of a set of conditioning keys (which specifies a color, and either a lower or an upper bound) while pointing to the variable or variables to which it will be applied. Examples of conditioning operations and keys are: red lower bound (r key), red upper bound (R key), green lower bound (g key), green upper bound (G key), blue lower bound (b key), and blue upper bound (B key). A single variable may be selected for conditioning by pointing the apparatus at the representation for a single variable (e.g., a histogram or a cumulative histogram), and the position representing the desired conditioning boundary (lower or upper edge of a region) within that variable. Two variables may he selected simultaneously for conditioning by pointing the pointing apparatus it the representation for two variables (e.g., a scatter plot), and the position representing the desired conditioning boundary (lower left or upper right corner of a rectangular region) within that variable. Again any method known in the art for pointing and selecting is contemplated in the practice of the invention.

Mutual coupling exists among the smaller presentations 210 and the edge presentations 230 on the main display array presentation 200. Due to mutual coupling, any change to or transform performed on a variable in a small presentation 210 or edge presentation 230 causes changes to ripple through the array presentation 200 to other variables which are related to the change(s). Using coupling, dependent variables are changed in the display in accordance with their relationships to other changed variables. The invention displays to the user the effects of any variable change on the entire database. The display is presented to the user in the format (selected variables, scale factors, customized functions, etc.) that the user defines.

Another feature, provided by the invention in the main display array presentation 200, is logical color operations. Logical color operations, described in greater detail below, allow the user to mark selected points with a first chosen color. The invention, through coupling (among the small 210 or edge 230 presentations), then brushes the color over the points in other presentations that are the same as and related to the marked points. Using a second color and point selection criteria, a second set of points are brushed. Brushing a third set or points, having a third selection criteria, with a third color is also possible. The brushed colors create a pattern on the array presentation 200, each color intersecting with other colors in some areas and not intersecting in other areas of the display. Where different brushed colors intersect, a different color results which marks points at the intersections. Points at intersections represent the subset of points of the intersection of selection criteria that the intersecting colors represent (logical AND operation). Brushed points, not at an intersection or color, represent points that have only the selection criteria represented by their brushed color. (These might be selected using a logical OR). As described below, similar operations can be performed using only one color. Accordingly, using color logic, a user can visually display the results of selection criteria logical operations, and other transformations applied to the database.

Figure 3:
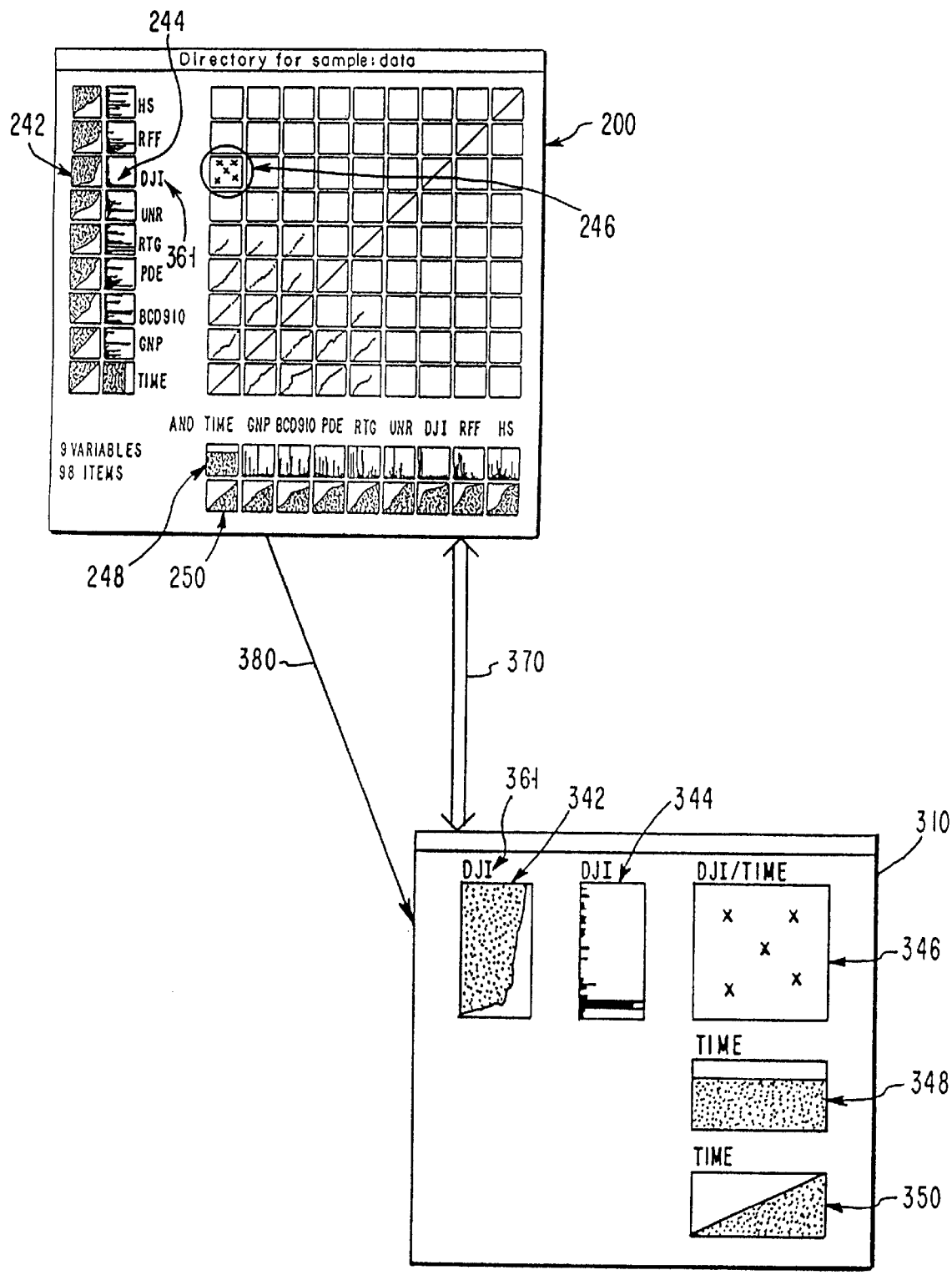
FIG. 3 shows an example of coupling, as displayed by the present invention, between an array of presentations of many variables and a subsidiary presentation of two variables.

FIG. 3 shows an example of accessing 380 a subsidiary presentation 310 from a main display array presentation 200. The main display presentation 200, in the preferred embodiment, is the same presentation described above and shown in FIG. 2. Subsidiary presentation 310 in general shows some subset of variables from the array presentation 200 in a variety of chosen data formats possibly including histograms, bar graphs, scatter plots, line plots, numeric tables, and three-dimensional scatter plots. A user accesses a subsidiary presentation from another presentation (like the main display array presentation 200) by pressing one of a set of subsidiary presentation keys while pointing to the variable or variables to which the accessing will be applied. Some examples of subsidiary presentation accessing keys are: more detailed and expanded pair-wise presentation (enter key), and a snake plot (tilde key). The relevant number of variables may be dependent upon the type of presentation selected. A single variable may be selected for a subsidiary presentation, by pointing the pointing apparatus at the representation for a single variable (e.g., a histogram or a cumulative histogram). Two variables may be selected simultaneously for a subsidiary presentation by pointing at the representation for two variables (e.g., a scatter plot). If necessary, multiple sequential uses of a subsidiary presentation key may be required to specify the total desired subset of variables.

The subsidiary presentation 310 in FIG. 3 shows enlarged and detailed views of the small and edge presentations 242, 244 246, 248, and 250 of the main display 200. Cumulative histogram 342 is an enlarger cumulative histogram 244 of variable DJI on display 200. Histogram 344 is an enlarged histogram 244 of variable DJI on presentation 200. Scatter plot 346 shows two variables DJI and Time in a larger format than is show on small presentation 246 in presentation 200. In like manner, histogram 348 and cumulative histogram 350 are enlargements of histogram 248 and cumulative histogram 250 edge presentations (the variable is Time) in presentation 200.

In addition to the subsidiary presentation 310 presentations 342, 344, 146, 348, and 350 shown in FIG. 3, other presentations can be displayed. These alternative presentations include: snake plots (which show three variables in a single scatter plot with lines between points connected in the order of any third variable), quad-wise plots (which show four variables, i.e., a pair of scatter plots, with lines between corresponding points), line graphs, bar graphs, and numeric tables (which may show information about any number of variables). The displays in a subsidiary presentation 310 may represent a subset of data of an ancestor presentation 200 or may represent the entire data base of the ancestor 200.

Mutual coupling exists within the subsidiary array 310 just as it does within the main display array presentation 200. As described above, mutual coupling changes dependent variables shown in small presentations (e.g., histogram 344) on the subsidiary presentation 310 in relation to changes or transforms performed on independent variables displayed in the subsidiary presentation. Changes are made using the same type of input apparatus. Color logic operations may also be performed within the subsidiary presentation 310.

Double arrow 370 in FIG. 3 illustrates the concept of mutual coupling between the array presentation 200 and the subsidiary presentation 310. This feature automatically changes dependent variables in a subsidiary presentation 310 if related variables are changed or transformed in the main array presentation 200 and visa versa. Using mutual coupling between the two presentations, a user can change or transform variables at one small presentation within the main array 200 or subsidiary 310 presentation and observe the changes in the related variables throughout the database and throughout both of the presentations. This allows the user to change detailed data in the subsidiary presentation 310 and see the general, overall effect in the array presentation 200 and visa versa. Color logic operations are also mutually coupled.

As an example of mutual coupling, a logarithmic scaling function can be applied to the variable named DJI 361 performed in the subsidiary display 310. Since both the array presentation 200 and the subsidiary presentation 310 show variable DJI 361, a change in scaling in the subsidiary presentation 310 is shown also in the array presentation 200. Since the coupling is mutual, a similar change in the array presentation 200 would also change the subsidiary presentation 310.

Single arrow 380 shows that the subsidiary presentation 310 is accessible from the main array presentation. To access a subsidiary presentation 310 from a main display array 200 (or any other subsidiary array) all of three access criteria are used. To access a subsidiary presentation, the user must first define all (default criteria may be used) of the following three access criteria for subsidiary presentations: (1) the type of subsidiary presentation on which the user wants to display the data, i.e., the display format, (2) the subset of variables in the array presentation that the user wants to examine, and (3) the subset of observations. (Throughout this explanation, a subset may include the entire original set.)

Accessing a child subsidiary presentation from a parent presentation requires selecting the variables and/or the observed data points in the parent that are to be displayed on the child. In most, but not all situations, the data to be displayed on the child will be a subset of the data or the parent. Conversely, parent presentations can not usually be accessed from a single child subsidiary display because the entire superset of data being displayed on the parent is not normally available on the child to define the data superset to be displayed on the parent. However, the present invention does allow access to a parent presentation from a child if all the data in the parent is present in the child, i.e., the child is a duplicate display of the parent or the child displays all the data of the parent in an alternative way. Further, if two or more progeny subsidiary displays can be combined so that together they contain at least all the data in a parent display, the parent display can then be recreated and accessed from the progeny. This is accomplished by selecting the display format of the parent and accessing the superset of data required in the parent from the appropriate subsidiary presentations. Physically, the display is assessed in a way similar to the one described above. (Note that although a subsidiary presentation may be accessed by way of a myriad of family relations once accessed its ancestry is irrelevant.)

Figure 4:
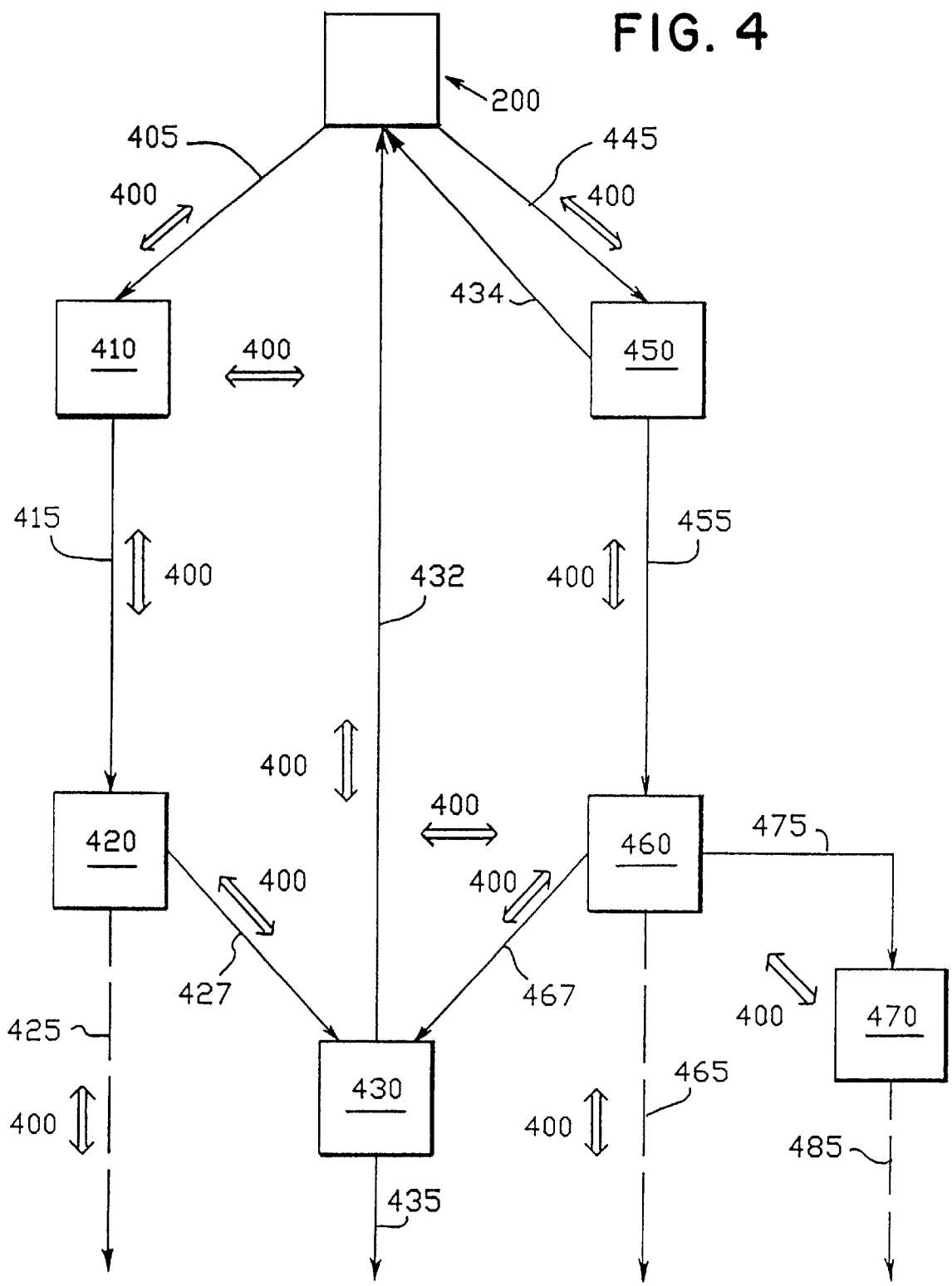
FIG. 4 shows the concept of accessing presentations by chaining in an embodiment of the present invention.

FIG. 4 shows a novel and very useful aspect of the present invention called chaining. Using the accessing criteria above, a user can access (arrow 405) a child subsidiary presentation 410 from a parent display 200. (The parent presentation may be the main display array presentation 200 or any other subsidiary display 410, 420, 430, 450, 460, or 470.) From a child presentation, for example child subsidiary presentation 410, the user can then access (arrow 415) a grandchild presentation 420. In like manner, a user can access (arrow 425) further progeny of the parent presentation 200. In this way, a chain of presentations is created, all of which are mutual coupled (double arrows 400) as described above. Furthermore, other chains of presentation, can be accessed (arrow 445) from a the same parent 200 or other subsidiary presentations 460 and arrows 465 and 475. In these other chains, grandchildren 460 are accessed (arrow 455) from children 450 and similarly other progeny can be accessed (arrows 435, 465, and 485). All of the presentations in all created chains are mutual coupled, double arrows 400, to one another and to those presentations in other chains.

As stated above, progeny of a parent presentation can not access the parent unless either all the variables and data points exist in the progeny presentation or the progeny can access enough data from other progeny to obtain all the necessary data to recreate the parent. In FIG. 4, parent presentation 200 is accessible (arrow 434) from child presentation 450 because (the child contains all the variables and data points contained in the parent 200, i.e., the child 450 is a duplicate presentation or the parent 200 or has all the data of the parent 200 shown in an different display format. Alternatively, a child 430 can be accessed (arrows 427 and 467) from two or more parent presentations 420 and 460, respectively. Multiple parents 420 and 460 which create children 430 may exist in the same or different chains. In this case, the child presentation 430 contained enough variables and data points, which it accessed from its parents 420 and 460, that it was able to recreate and access (arrow 432) the original parent 200.

The novelty and versatility of the present invention is further enhanced because each presentation in the chain has all the internal mutual coupling, transformation capability, and color logic functions, as described above for the main display array presentation 200. Therefore, a user can select certain data, using selected criteria in a parent display 200, explore the selected data in more detail in a child presentation 410, and continue selecting, transforming and operating on data in finer detail using other presentation progeny in a chain. Other chains may be created to explore other variables or other aspects of the variable explored in the first chain. Information can be accessed (arrows 427 and 467) from presentations in different chains and other presentations created 430. From these further progeny can be accessed (arrow 435). All presentations remain mutually coupled.

Figure 5:
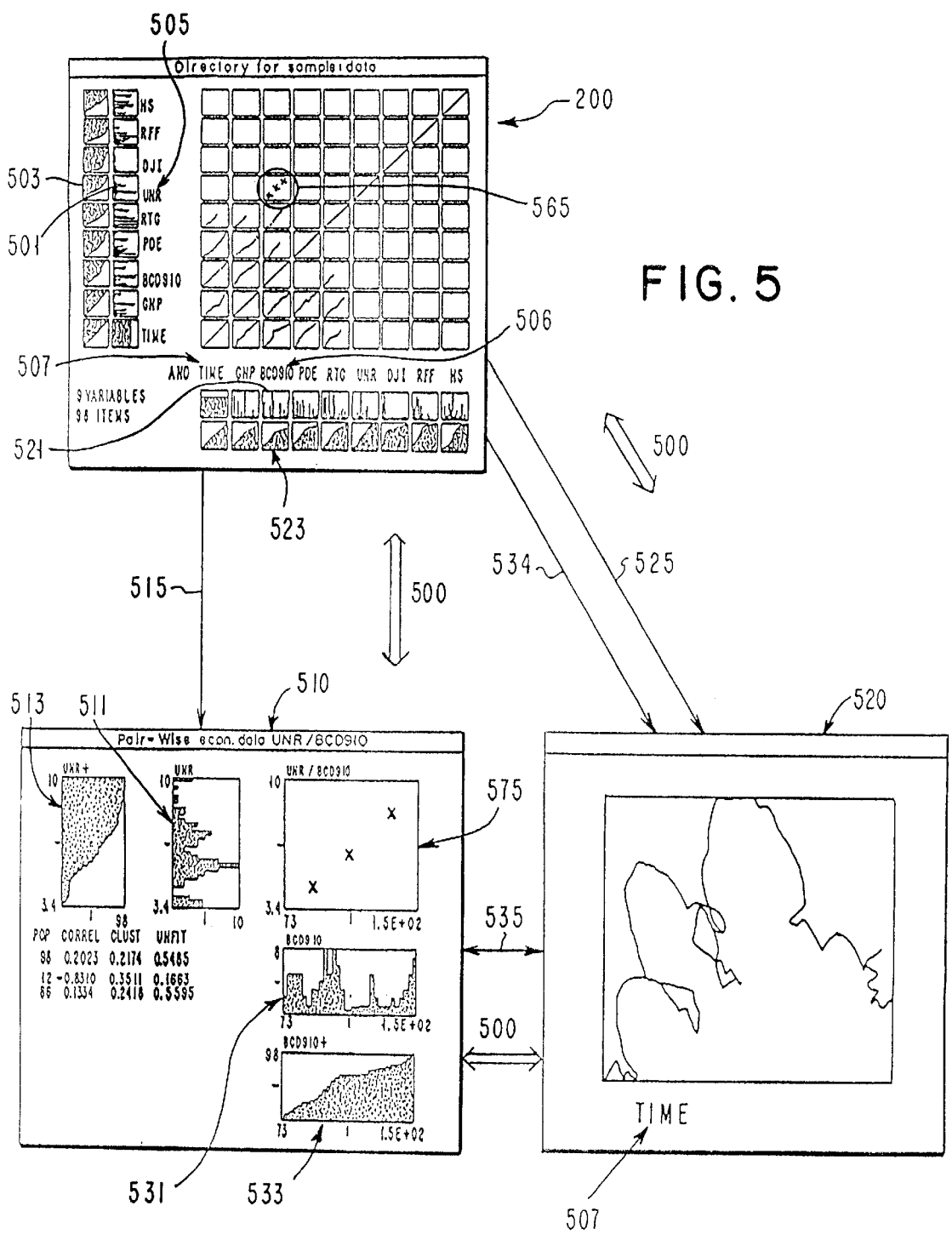
FIG. 5 shows an example of coupling between an array of presentations of many variables, a subsidiary presentation of two variables, and another subsidiary presentation of three variables, as performed and displayed by one embodiment of the present invention.

FIG. 5 shows all example or coupling between an array of presentations of many variables 200, a subsidiary presentation 510 of two variables, and another subsidiary presentation 520 of three variables. From parent presentation 200, two child subsidiary presentations 510 and 520 are accessed (arrows 515 and 525 respectively). (Note that child displays 510 and 520 could be used to access progeny and thereby create two chains of presentations.) The subsidiary presentation 510 depicts two variables UNR 505 and BCD910 506 by showing enlarged and more detailed views of a family of plots from the array of presentations. Specifically, the histogram 501 and cumulative histogram 503 of variable 505 on parent presentation 200 are shown on subsidiary presentation 510 as histogram 511 and cumulative histogram 513 respectively. In like manner, histogram 521 and cumulative histogram 523 of variable 506 on parent presentation 200 are shown on child subsidiary presentation 510 as histogram 531 and cumulative histogram 533 respectively. The selected scatter plot 565 for the two variables 505 and 506 on parent presentation 200 is enlarged and shown 575 on child subsidiary presentation 510. Alternatively child presentation 520 shows a snake plot of the two selected variables 505 and 506, plotting the corresponding data points of these variables together on scatter plot with lines connecting the points in a sequence determined by a third variable (e.g. increasing variable Time: 507). The double arrows 500 show that the three presentations 200, 510, and 520 are mutual coupled, i.e., a change of a data point or variable in any of the presentations will cause changes in the other presentations according to the relationship of the changed variables to the other variable presented.

FIG. 5 illustrates how child subsidiary presentations can be accessed in a variety of ways. Parent presentation 200 could access both presentation 510 and 520 shown as arrows 515 and 525 respectively. Alternatively, the parent presentation 200 could access 515 child presentation 510 while the child subsidiary presentation 520 could be accessed 534 and 535 from a combination of both the parent presentation 200 and the child subsidiary presentation 510. Additionally, the child subsidiary presentation 520 could be accessed 525 from the parent presentation 200, while the other child subsidiary presentation 510 could be accessed 535 from subsidiary presentation 520 alone. Note that all presentations 200, 510, and 520 in FIG. 5 are mutually coupled with one another as shown by double arrows 500.

Figure 6:
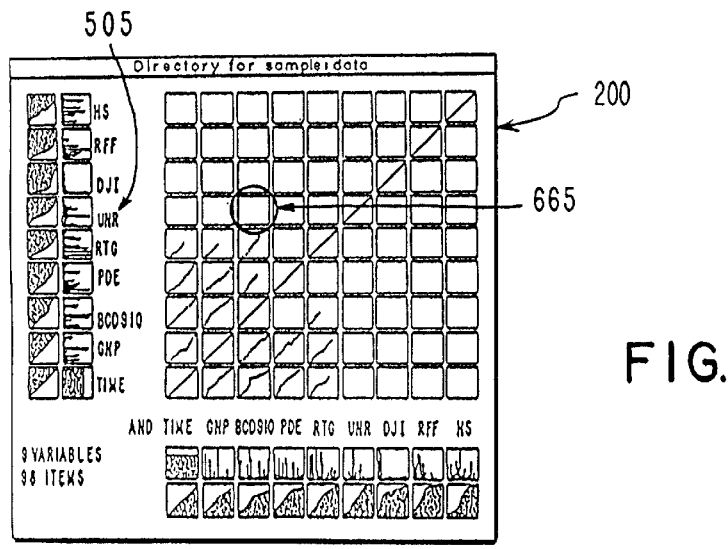
FIG. 6 shows an example of a modification to a variable coupled between an array of presentations of many variables, a subsidiary presentation of two variables, and another subsidiary presentation of three variables as performed and displayed by one embodiment of the present invention.
Figure 6:
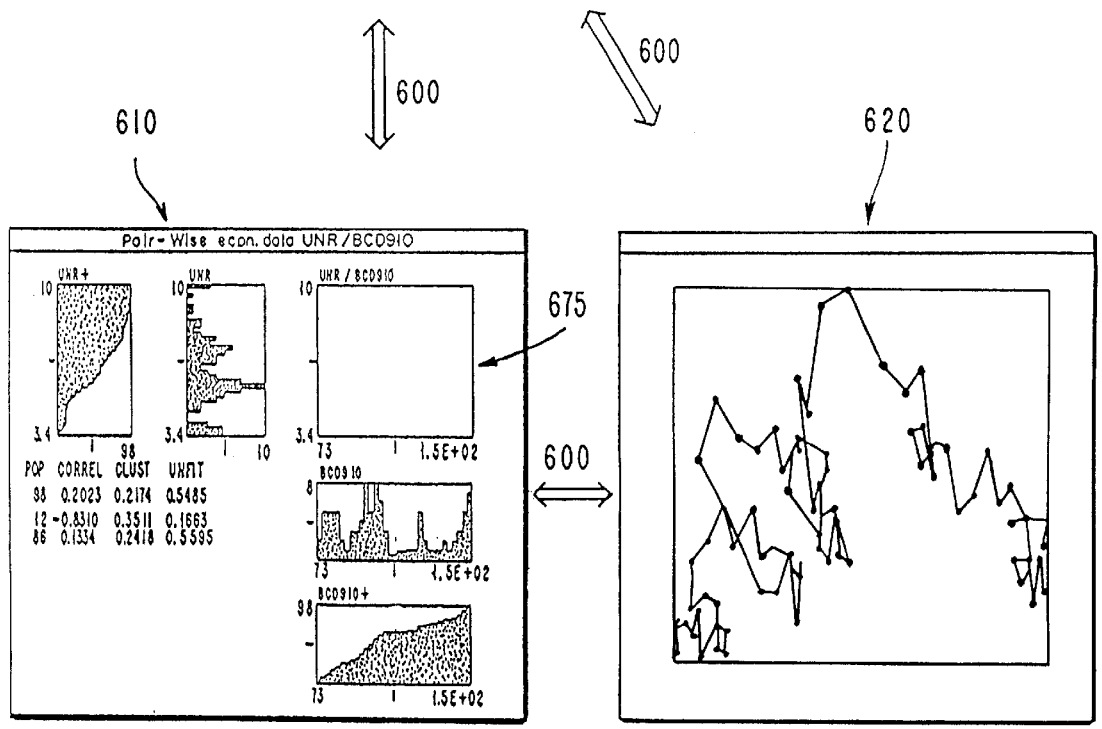

FIG. 6 shows an example of the effect of mutual coupling among presentations (the same presentations as in FIG. 5) using a scaling function. This scaling function called a "jittering or fuzzing" scaling function is applied to a variable named UNR 505 in the database. This function adds 25% of random noise to the variable and has the effect of spreading out points in the scatter plots. Spreading the points out like this sometimes results in clearer presentations, especially if the plot had many overlapping points. (Note the change between the unsealed snake plot 520 in FIG. 5 and the scaled snake plot 620 in FIG. 6). Since the parent presentation 610, an array presentation, and both of the two child subsidiary presentations 610 and 620 show variable UNR 505, they all reflect any change made to this variable. Since all the couplings are mutual 600, the variable can be scaled either on the parent presentation 610, or on either of the subsidiary presentations 610 and 620 with the same result.

Figure 7:
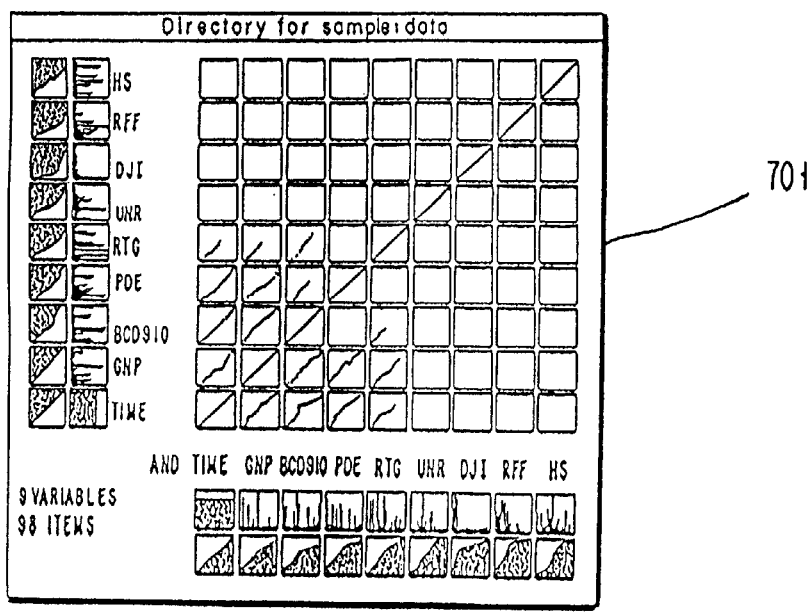
FIG. 7 shows an example of decoupling between an array of presentations of many variables and another array of presentations of many variables as performed and displayed by one embodiment of the present invention.
Figure 7:
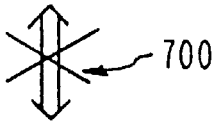
Figure 7:
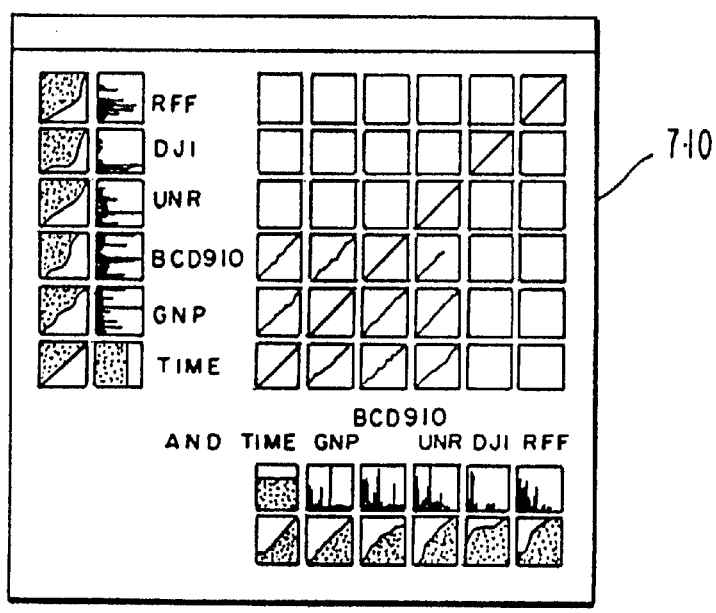

FIG. 7 shows in example or decoupling between a parent presentation 701, here an array of presentations of many variables and child presentation 710, here also an array of presentations of many variables. The variables in the child presentation 710 are a subset of the parent's 701 variables. As the crossed out double arrow 700 shows, these two presentations are decoupled, i.e., not mutually coupled. When a user selects this method of operating the invention, any change to a variable in any decoupled presentation does not cause a change in any other presentation even if there is a relationship among the variables. Decoupled plots can be used to preserve all the current transformations, conditioning, small presentations, and subsidiary presentations to create a presentation to be used as a "check point." Transient changes made to other presentations can be compared to the check point and then easily discarded or preserved without changing the check point.

Figure 8:
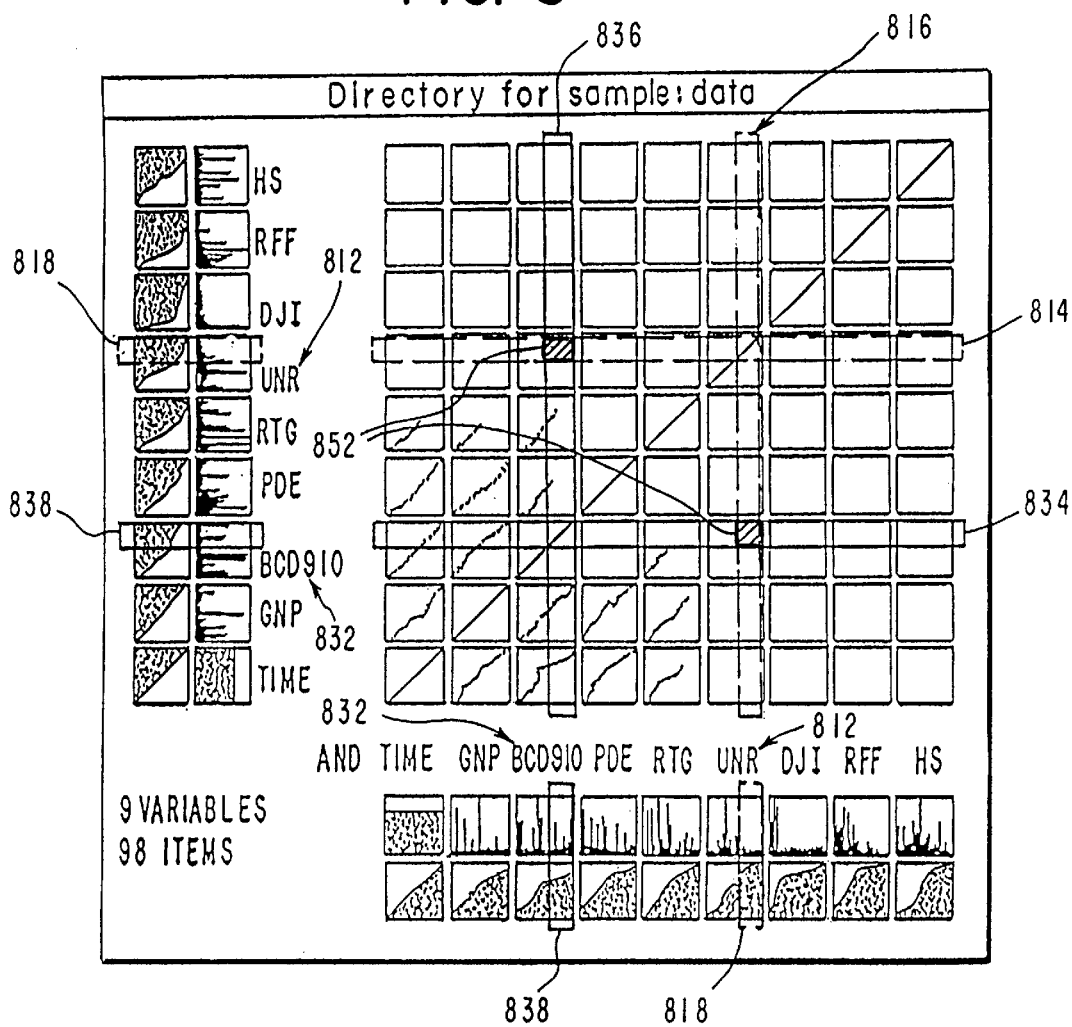
FIG. 8 shows an example of presenting two independent conditions on the data using two primary colors in an embodiment of the present invention.
Figure 8:
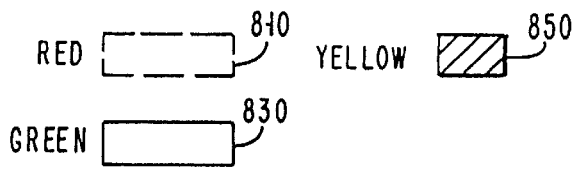

FIG. 8 shows an example of presenting two independent conditions on the data using two primary colors. The primary color red 810 has been used to indicate high values of the variable UNR 812. This is indicated by bands of dark red background running both horizontally 814, and vertically 816 through the high values of all the plots involving variable UNR 812. Every dot in every scatter plot is colored bright red if it relates to a high value for variable UNR. Similarly, every bar in every histogram and cumulative histogram has a segment colored bright red 818 if it covers a set of observations related to a high value for variable UNR. Additionally, the primary color green 830 has been used to indicate high values of the variable BCD910 832. This is indicated by bands of dark green background running both horizontally 834 and vertically 836 through the high values of all the plots involving variable BCD910 832. Every dot in every scatter plot is colored bright green if it relates to a high value for variable BCD910 832. Similarly, every bar in every histogram and cumulative histogram has a segment colored bright green 838 if it covers a set of observations related to a high value for variable BCD910 832. More importantly, red and green are primary colors, and wherever they intersect they form yellow 850. This is indicated by a rectangle of dark yellow background 852 in all the plots involving both the variables UNR and BCD910. Every dot in every scatter plot is colored bright yellow if it relates to a high value for variable UNR and a high value for variable BCD910. Similarly, every bar in every histogram and cumulative histogram has a segment colored bright yellow if it covers a set of observations related to a high value for variable UNR and a high value for variable BCD910.

By using color, not only can observational be identified by a color, e.g., yellow at the intersection of two data sets but also these identified observations can then be selected to display on accessed subsidiary presentations. The subsidiary presentation(s) will display the selected points which will be brushed with the same color as they are in the parent presentation. Since the presentations are mutually coupled, color logic performed on either presentation will be reflected in the other presentation.

Figure 9:
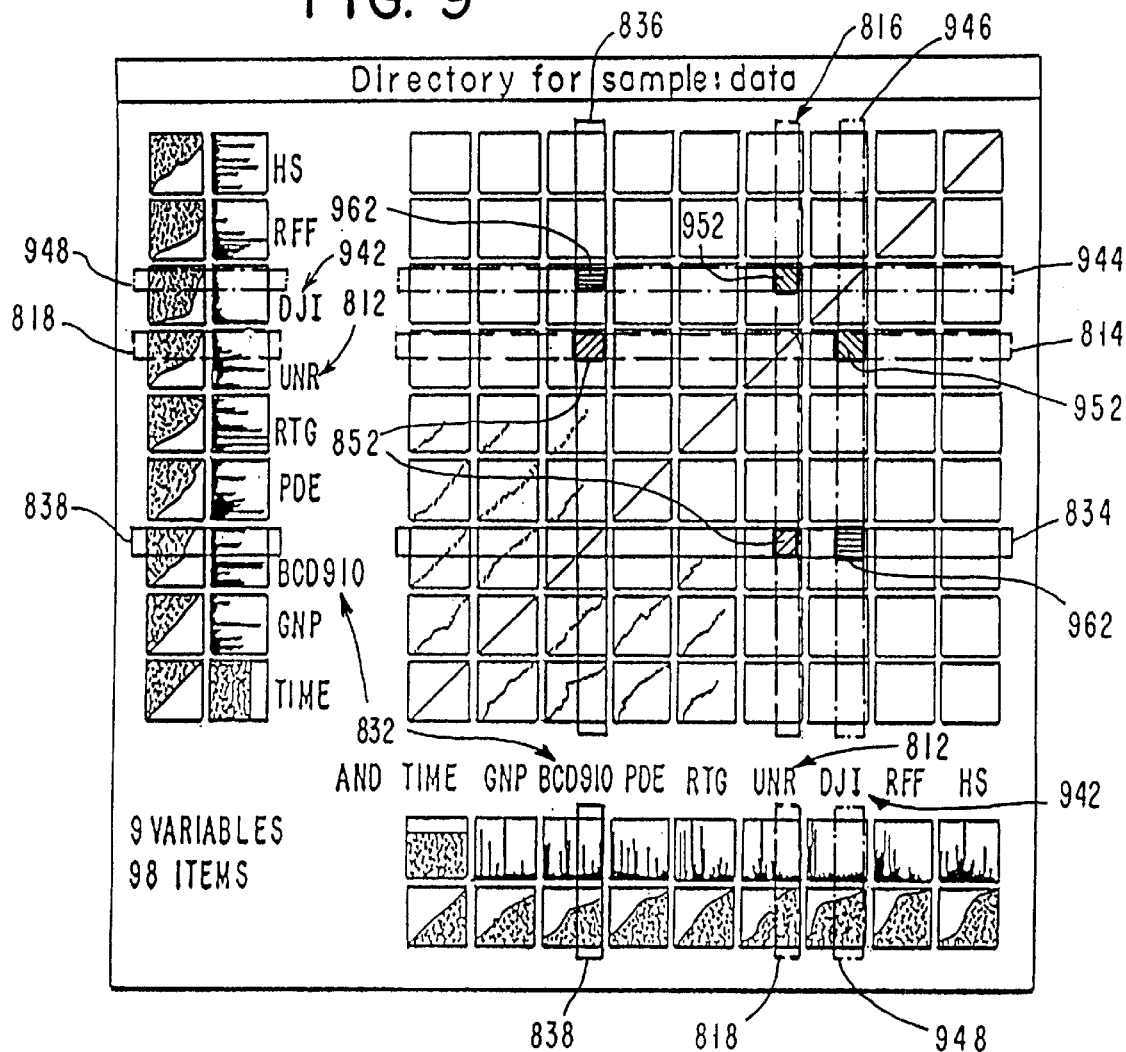
FIG. 9 shows an example of presenting three independent conditions on the data using three primary colors in an embodiment of the present invention.
Figure 9:
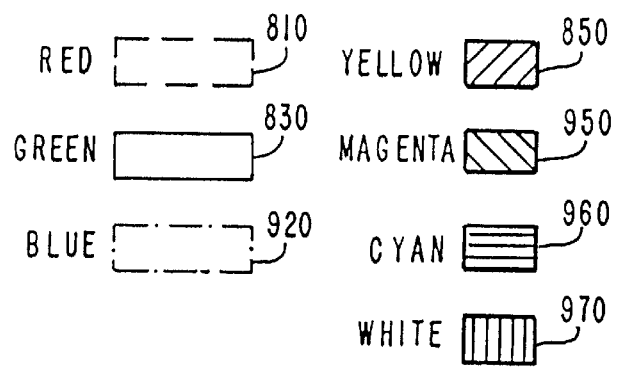

FIG. 9 shows ail example or presenting three independent conditions on the data using three primary colors. The uses of the colors red 810, green 830, and yellow 950 are identical to those in FIG. 8. Additionally, the primary color blue 920 has been used to indicate high values of the variable DJI 942. This is indicated by bands of dark blue background running both horizontally 944 and vertically 946 through the high values of all the plots involving variable DJI 942. Some observed data points in the scatter plots are colored bright blue 920 if they are related to the blue brushed high values selected for variable DJI 942. Similarly, every bar in every histogram and cumulative histogram has a segment colored bright blue 948 if the segment covers a set of observations related to the high values for variable DJI 942.

More importantly, logical operations can be performed with the three colors and subsidiary presentations can be accessed based on these operations. Red, green, and blue are all primary colors. Wherever red and green intersect they form yellow 850. Wherever red and blue intersect they form magenta 950. Wherever green and blue intersect they form cyan 960. Wherever red, green, and blue intersect they form white 970. The area brushed yellow 852 includes data points which are in the intersection of the set of points brushed red (high UNR 812) and brushed green (high BCD910 832). The areas of dark magenta 952 includes data, points which are in the intersection of the set of points brushed red (high UNR 812) and brushed blue (high DJI 1942). The areas of dark cyan 962 include data points which are in the intersection of the set of points brushed green (high BCD910 832) and brushed blue (high DJI 942) in all the plots involving both the variables BCD910 and DJI. Because of mutual coupling in the presentation, every dot in every scatter plot is colored bight yellow if its set of related observations includes a high value for variable UNR and a high value for variable BCD910; bright magenta if its set of related observations includes a high value for variable UNR and a high value for variable DJI; bright cyan if its set of related observations includes a high value for variable BCD910 and a high value for variable DJI; or bright white if its set of related observations includes a high value for variable UNR and a high value for variable BCD910 and a high value for variable DJI (White points are not s shown in the figure.) Similarly, every bar in every histogram and cumulative histogram has a segment colored bright yellow if it covers a set or related observations including a high value for variable UNR and a high value for variable BCD910; bright magenta if its set of related observations includes a high value for variable UNR and a high value for variable DJI; bright cyan if its set of related observations includes a high value for variable BCD910 and a high value for variable DJI; or bright white if its set of related observations includes a high value for variable UNR and a high value for variable BCD910 and a high value for variable DJI. Using a presentation like this as a parent, points selected with the color logic described above can be display on child subsidiary presentations. Because of mutual coupling between the parent and child presentations, further color logic operations can be performed on either presentation and the related effects of these operations, e.g., the marking of points with a color, will be reflected in the other presentation.

Figure 10:
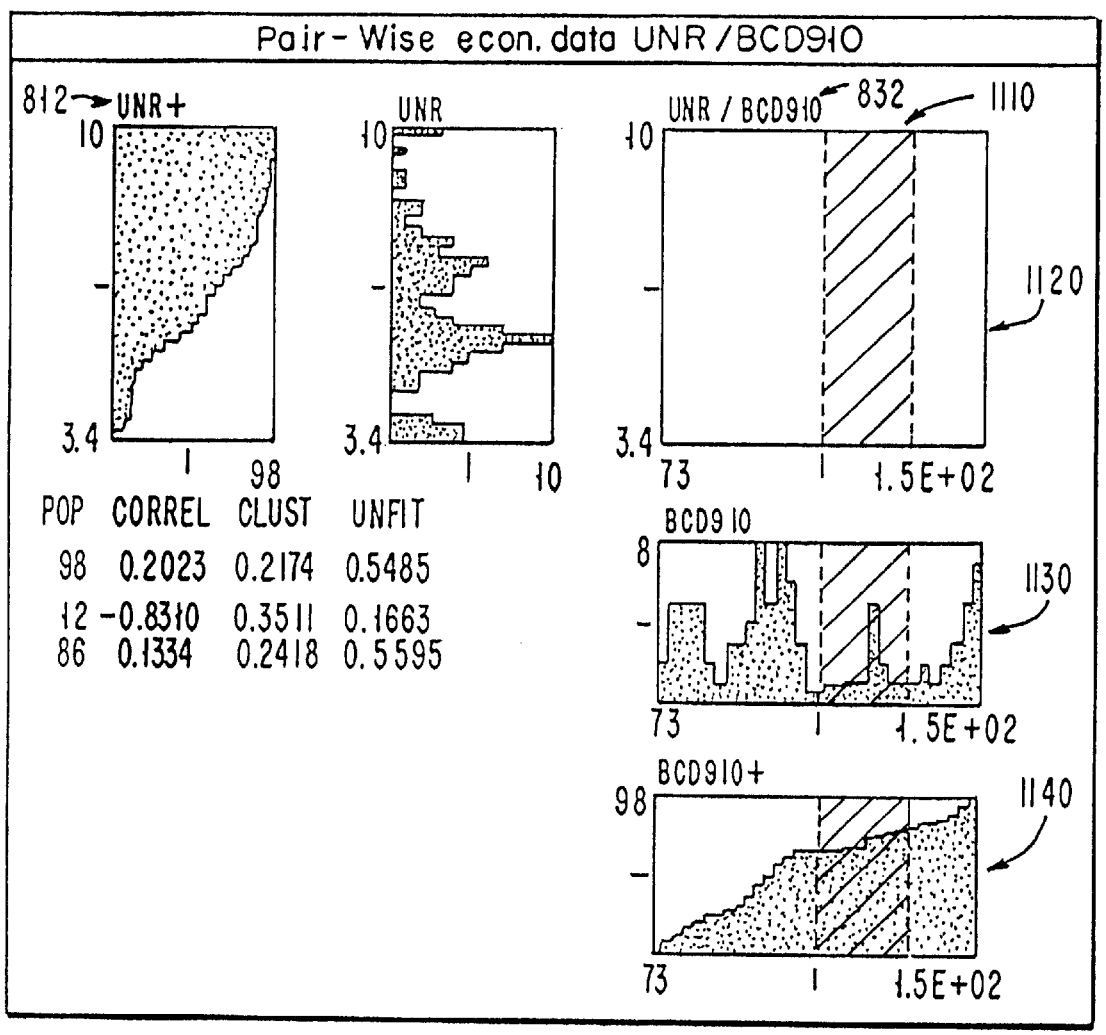
FIG. 10 shows identification of a range of a variable with one color on an embodiment of the present invention.
Figure 11:
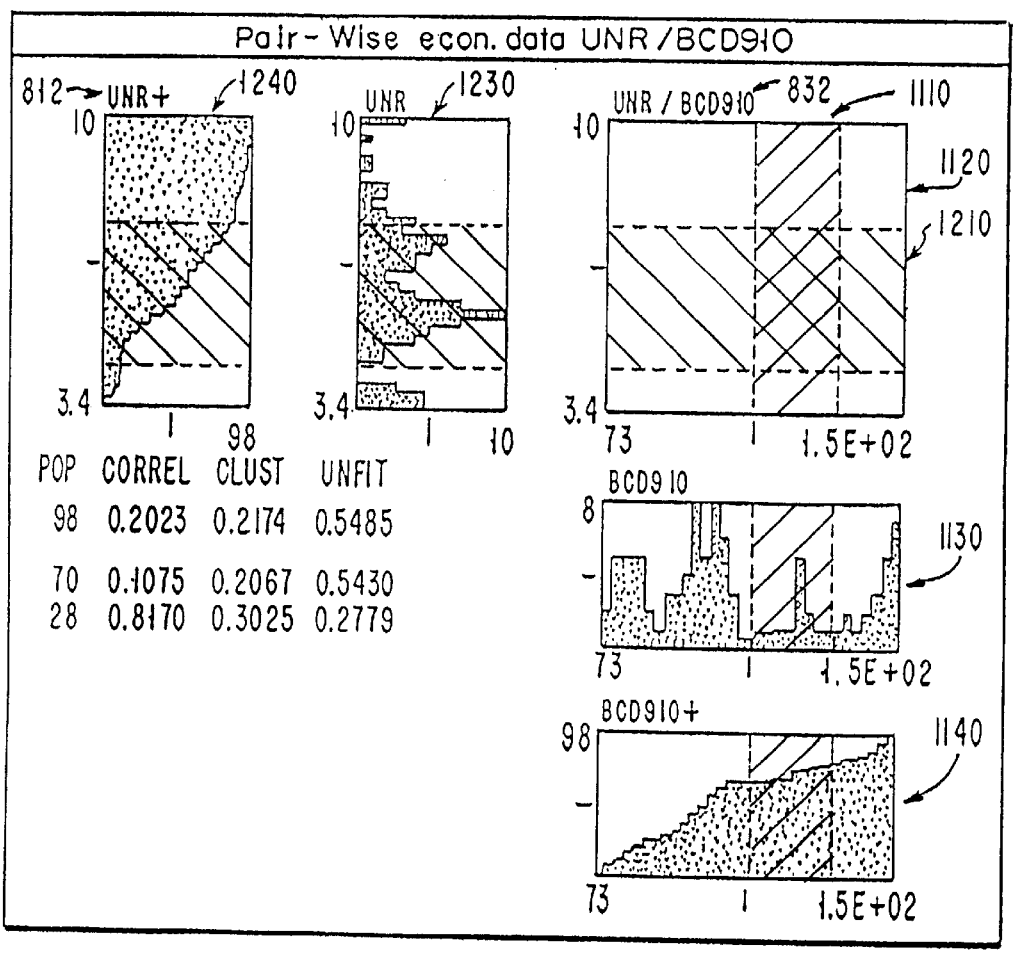
FIG. 11 shows a logical OR operation with two uses of a single color on an embodiment of the present invention.
Figure 12:
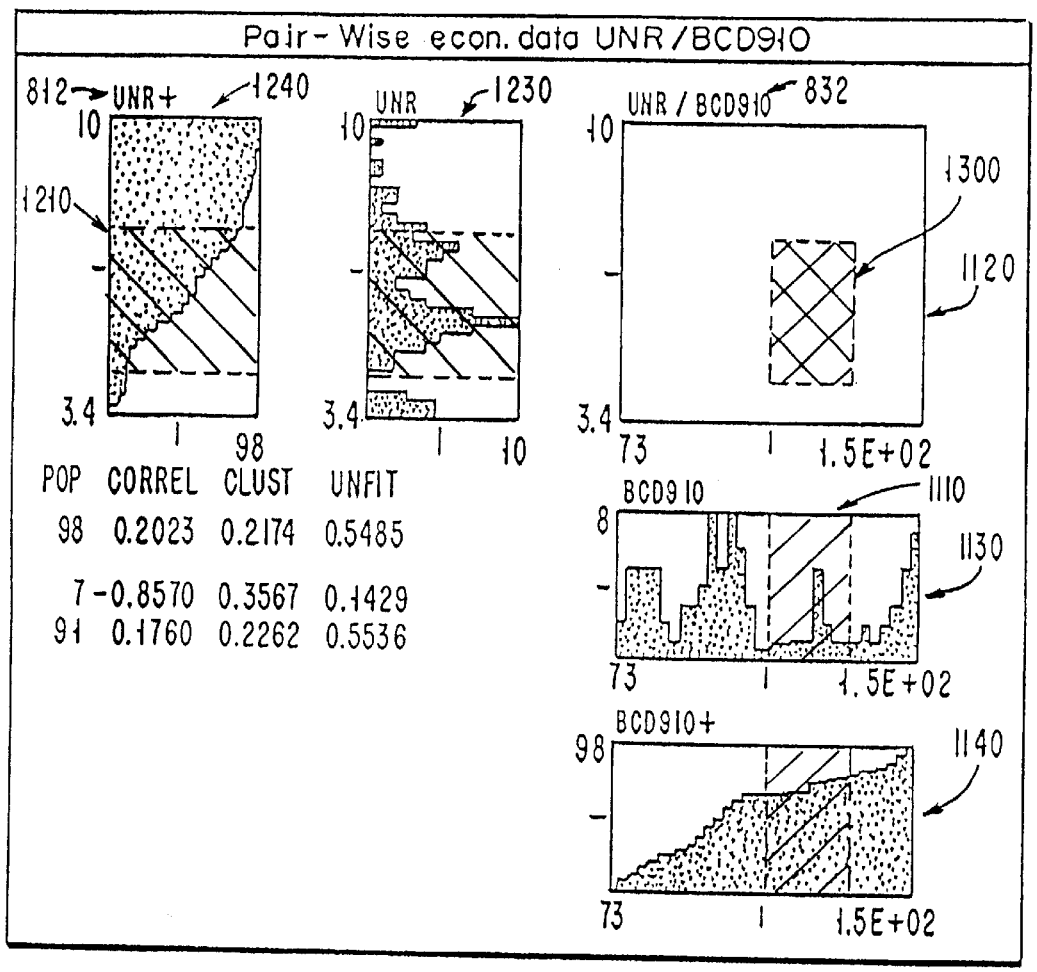
FIG. 12 shows a logical AND operation with two uses of a single color on an embodiment of the present invention.
Figure 13:
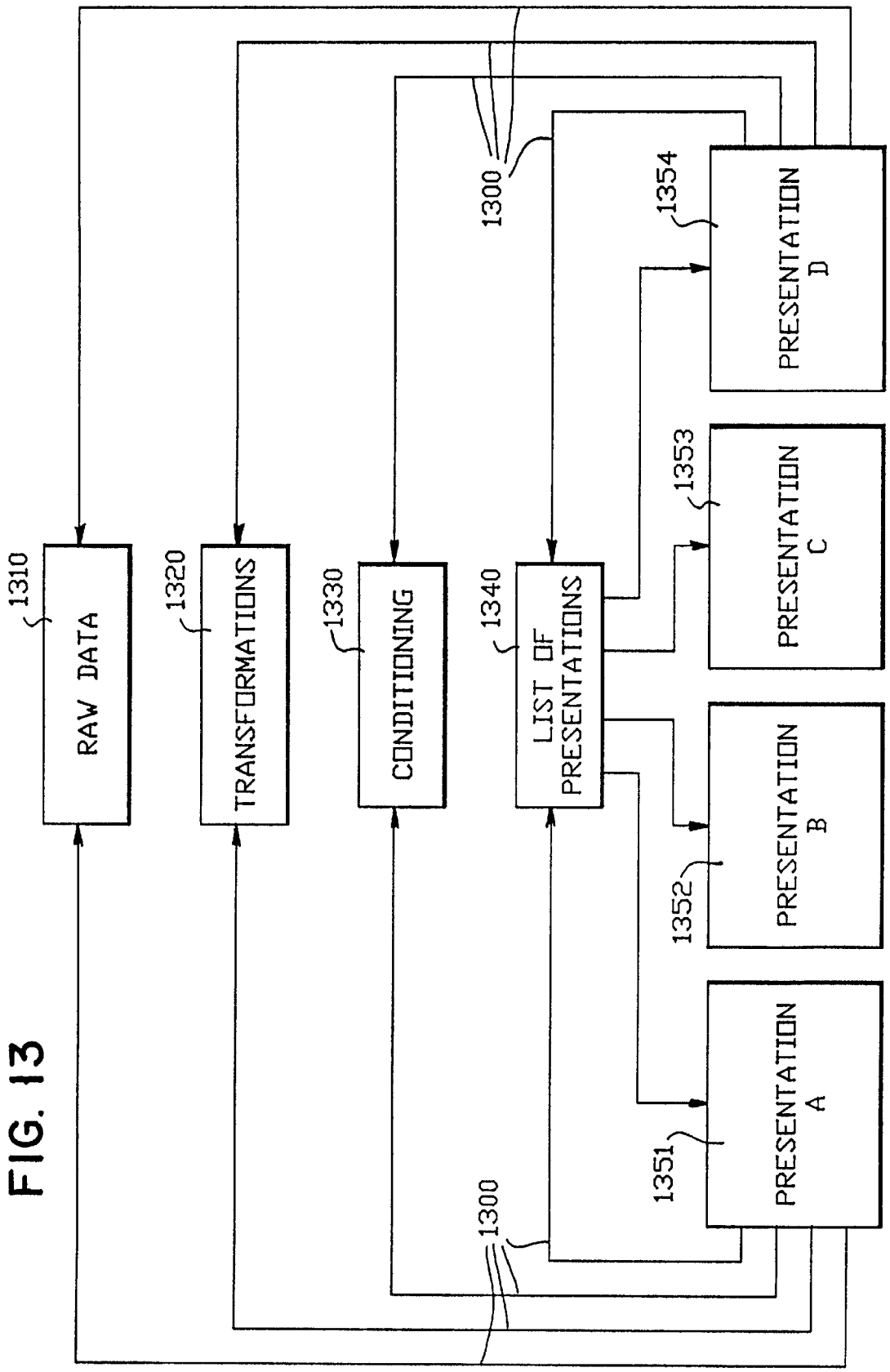
FIG. 13 shows an overview of the computer program of the invention.

To further illustrate the uses of color logic FIGS. 10, 11 and 12 depict color logic operations using only one color. The Figures illustrate color logic with one color for two variables but the same approach can be extended to any number of variables.

FIG. 10 shows an example of a single use of a single color, red. In the figure lower and upper bounds of the variable BCD910 832 (i.e., a range of the variable) have been defined by the vertical red bar 110. The vertical bar shows the limits between the bounds as a background color on the scatter plot 1120, the histogram 1130, and cumulative histogram 1140 of the variable. All data points inside this bar region are colored bright red while those outside the region are grey.

FIG. 11 is a repeat of FIG. 10 with a horizontal red bar 1210 added to delimit a range of variable UNR 812. The Figure shows a logical OR operation with two uses of a single color. The red background color of the scatter plot 1120, histograms 1130 and 1230, and cumulative histograms 1140 and 1240 delimit the region between the bounds. All data points inside the region of the horizontal 1210 and vertical 1110 red bars are colored bright red. Those outside the bars are grey. The red points represent the union of the selected region of points for both variables, i.e., a logical OR.

FIG. 12 is a repeat of FIG. 11 but is shows a logical AND operation with two uses of a single color. The selected ranges of variable UNR 812 and BCD910 832 have been brushed with the horizontal 1210 and vertical 1110 red bars respectively. The intersection of the two selected ranges 1300, is brushed red in the scatter plot 1120. Points outside the intersection in the scatter plot are grey.

Using the presentations shown in FIGS. 10, 11, and 12 as parent presentations, subsidiary presentations can be accessed which display points selected with one color. These points can represent ranges (FIG. 10), unions or logical ORs (FIG. 11), or intersections or logical ANDs (FIG. 12). Since the child presentation is mutually coupled to the parent, any operation on the parent or child, including color logic operations will have, their results reflected in the related variables on the other presentation.

The present invention has been implemented in the C programming language and runs under any X-Windows platform. In particular, the preferred embodiment runs on an IBM Risc System 6000 (e.g., model 520, 530 or 540) with the AIX operating system. The standard system configuration of a color display, a keyboard, and a mouse is adequate. A large format display is preferred. The preferred embodiment uses a display with at least 1024 by 1024 pixels. Although this equipment is used in the preferred embodiment, any computer systems with equivalent capability for running the invention is within the contemplation of the inventor for practicing the invention.

FIG. 11 shows an overview of the computer program of the invention. The essential components of the program include raw data 1310, transformations 1320, conditioning 1310, list of presentations 1340, and the presentations displayed (1351 through 1354).

The raw data 1310 is just the original table of numbers or tokens, organized as a list of vector variables. A table of data as shown in FIG. 1 and described above has a typical format.

The transformations component 1320 applies mathematical functions, like scaling, to the raw data of the variables. Each variable potentially can have a mathematical function or even a series of mathematical functions sequentially applied to it. Examples of mathematical functions (i.e., scaling factors) include: identity, square root, square, cube root, cube, logarithm, exponential, negative, reciprocal, and others.

The conditioning component 1330 stores the coordinates of the boundaries of the color regions for each variable. Potentially, one lower bound and one upper bound are stored for each primary color (eg., red, green, and blue) for each variable. The logical function to be applied to a color (e.g., AND and OR) is also stored in this component.

The list of presentations maps 1340 the transformed and conditioned data to the main array presentation and all the subsidiary presentations which happen to be in use. The list is used to scan all the current presentations for interactive inputs which may change any of the transformation or conditioning. Interactions may also access or delete presentations from the currently active list. The list of presentations is also used to update all the current presentations as necessary whenever any of the transformations, conditions, or presentations are interactively changed.

Each of the main array presentation and all the subsidiary presentations contain the definitions of their own display format and their possible interactions. Each presentation is displayed in a window. The definition of the display format of a presentation includes which plots or tables or pictures to show in the window and how to show them (e.g., derivation, order, perspective, fonts, colors, etc.), and the arrangement of them within the window. The definition of the possible interactions of a presentation includes a list of acceptable user actions (e.g., key presses, mouse clicks, etc.) which are often associated with a position within the window through a pointing device (e.g., a mouse). All the possible interactions are mapped into changes of either the raw data, the transformations, the conditioning, or list of currently active presentations. These changes are made through presentations 1351 through 1354 as shown by arrows 1300.

Figure 14:
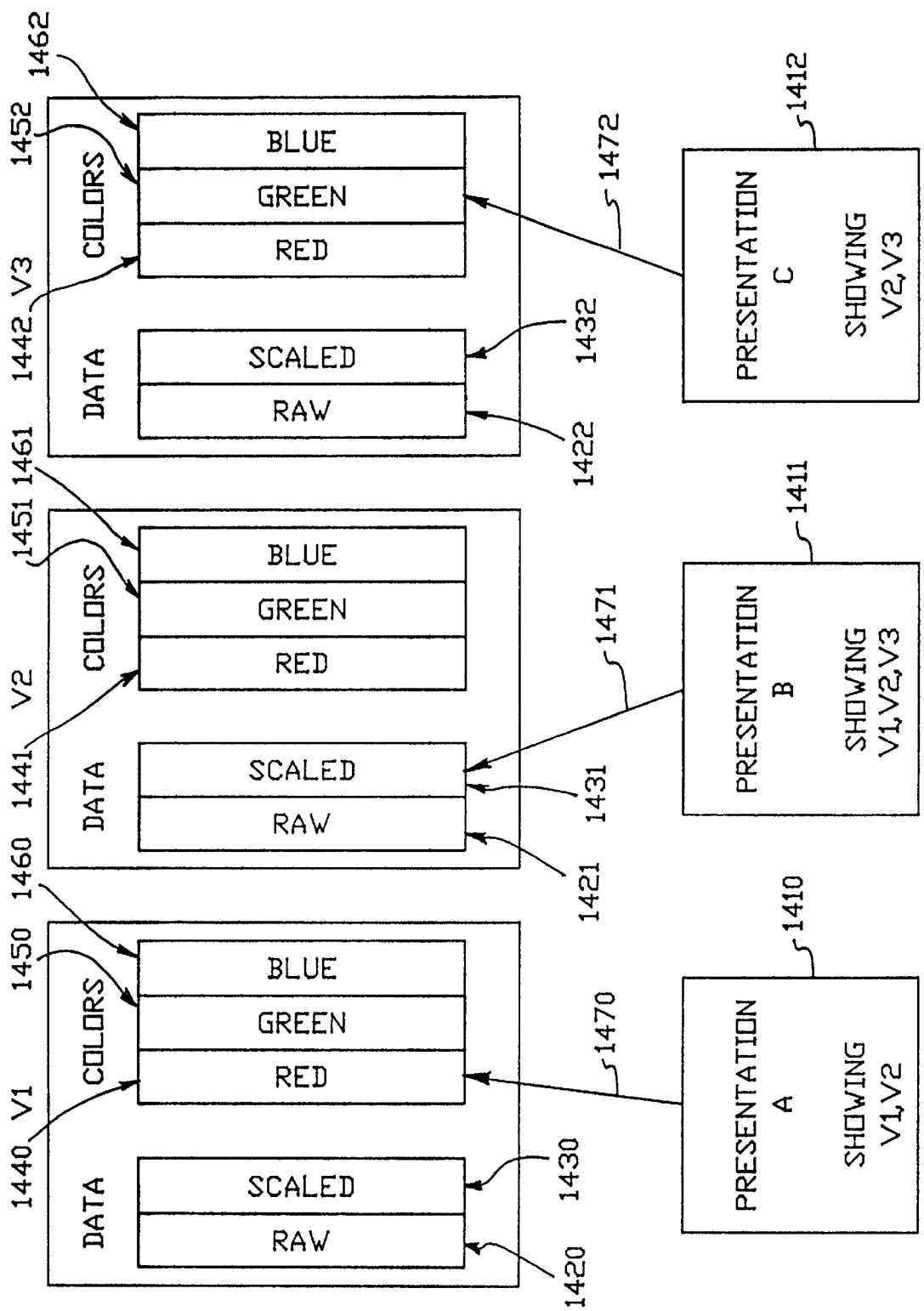
FIG. 14 shows how mutual coupling is implemented in one embodiment of the invention.

FIG. 14 shows how mutual coupling is implemented using a data base of three variables V1, V2, and V3 and three presentations 1410 through 1412 as examples.

For each variable parameters are defined i.e., there is a vector of raw data 1420 through 1422, a vector of scaled data 1430 through 1432, and a specification for the boundaries of each of three primary color regions (red boundaries 1440 through 1442, green boundaries 1450 through 1452, and blue boundaries 1460 through 1462).

In this example, different combinations of the three variables are presented in the presentations 1410 through 1412. Presentation A 1410 shows variables V1 and V2, presentation B 1411 shows variables V1, V2 and V3 and presentation C 1412 shows variables V2 and V3. Each presentation 1410 through 1412 can alter (arrows 1470 through 1472) the data base parameters for any of the variables it shows.

In FIG. 14, presentation A 1410 is changing (arrow 1470) the red region for variable V1 (red boundary parameter 1440). Since both presentation A 1410 and B 1411 show variable V1 and both presentations access the same parameter 1440 for the red bound, the red bound change 1470 mutually affects both presentations 1410 and 1411. The change 1470 to the red bound in variable V1 may also indirectly affect presentation C as well, if presentation C is displaying any points which are now in a different color region as a result of the changed red region in variable V1.

Also in FIG. 14, presentation B 1411 is changing the scaling function 1431 for variable V2, thus directly affecting presentations A, B, and C. This is because all three presentations show variable V2 and access the changed 1431 scale factor from the same location 1431. The change 1471 to the scaling function of variable V2 may indirectly affect other presentations (not shown in the Figure) as well, if those presentations are displaying any points which are now in a different colored region as a result of the changed 1471 scaling function with respect to any of the color regions in variable V2. The affected presentations could also be displaying points with dependencies on the newly scaled variable V2.

Further in FIG. 14, presentation C is changing 1472 the green region for variable V3. This directly affects (mutually couples) both presentations B and C because they are both showing variable V3 and both obtain the green bounds from location 1452. The change 1472 may indirectly affect presentation A as well if presentation A is displaying any points which are now in a different color region as a result of the changed 1472 green bounds on variable V3.

In general, any presentation can directly alter any of the parameters of any of the variables it is displaying. Other presentations, displaying the changed variables are mutually coupled to the first presentation because all presentations access the same changed parameter.

FIG. 15 shows the processing of interaction events. Interaction events 1510, such as key presses or mouse clicks, can invoke a wide variety of operations including transforming variables, conditioning variables, and accessing subsidiary presentations. In each case, which operation is performed depends upon which interaction device (e.g.—key or mouse button) is used, and also where the pointing device was pointing when the event occurred.

All interaction events are first mapped to operations in 1520. For example, the escape key operation might be to delete a presentation, and the l key operation might be to apply a logarithmic scaling function to a variable.

All interaction events are also refined to determine the current presentation in 1530 (e.g.—which presentation was being pointed at by the pointing device when the event occurred). This may be either the main array presentation, or any subsidiary presentation. Once the current presentation has been determined, the current location within that presentation may be determined as a pair of x,y coordinates. This pair of x,y coordinates may be used to indicate which current field or sub-area within the presentation according to the type of the current presentation. For example, if the current presentation is the main array presentation then the pair of x,y presentation coordinates may indicate which field or plot element of the array is indicated, if any.

Once a particular field or sub-area of the presentation is determined, the pair of x,y coordinates may be further used to indicate a particular location within that field or sub-area in 1570. For example, if the current field of the current presentation is a particular scatter plot within the main array presentation, then the pair of x,y field coordinates may indicate a particular corner of a rectangular color region.

Not all resolution and refinement steps need be required for every kind of interaction. Operations that affect or use all entire presentation need no further resolution than the current presentation, as decided in 1540. For example, the press of a particular key (like the escape key) might operationally delete the current presentation entirely, irrespective of what field or location within the presentation was indicated, as in 1545.

Operations that affect or use an entire field within a presentation need no further refinement than the current field, as decided in 1560. For example, the press of a particular key (like the 1 key) over a histogram of one variable in the main array presentation might apply a logarithmic scaling function to that variable, irrespective of what location within the histogram was indicated, as in 1565. For another example, the press of a particular key (like the enter key) over a scatter plot of two variables in the main array presentation might operationally access a certain type of subsidiary presentation of those same two variables, irrespective of what location within the scatter plot was indicated.

Operations that required a list of argument may be decomposed into sequential selecting operations. This is typically true of operations which access subsidiary presentations, since one of the access criteria is a subset of the variables. Components of sequentially decomposed operations need not come from the same presentation. As many presentations (either main or subsidiary) as components may contribute.

Operations that require the selection of two variables could alternatively be decomposed into two sequential operations that require the selection of a single variable. For example a new subsidiary presentation of two variables may be accessed by sequentially selecting the first variable from the main array presentation and the second variable from any subsidiary presentation.

Operations that required the selection of three variables could alternatively be decomposed into two sequential operations that require the selection of one variable and then two variables, or two sequential operations that require the selection of two variables and then one variable, or three sequential operations that each require the selection of a single variable. For example, a new subsidiary presentation of three variables may be accessed by sequentially selecting the first variable from the main array presentation, and the second variable from any subsidiary presentation, and the third variable from the same or any other subsidiary presentation. All presentations and subsidiary presentations have equal status with respect to contributing to sequential operations, irrespective of how each was originally accessed.

Operations that require the selection of more than three variables would have many possible sequential decompositions.

We claim:

1. An apparatus for visually showing a relationship among a plurality of variables on a computer display, each variable comprising a set or vector of observations, the apparatus comprising:
    a computer, including the computer display, the computer having a memory containing one or more of the variables and having the capability of displaying visual representations of the variables on the computer display;
    a visual array presentation of small presentations on the computer display, each array small presentation visually representing the relationship among a subset of the variables;
    a mutual coupling between the array small presentations, some array small presentations having one or more dependent variables related to an independent variable so that a change to the independent variable will visually change all array presentations having dependent variables in accordance with the relationship among the independent and dependent variables; and
    one or more mutually coupled subsidiary presentations, each presenting a subset of variables,
    whereby a user changes one or more independent variables to view the visual changes to the array presentation in order to determine the relationship among the variables.

2. A display, as in claim 1, where each subsidiary presentation is mutually coupled to one or more of the array small presentations so that a change to one or more variables in the mutually coupled subsidiary presentation will visually change array presentations displaying variables according to a dependency relationship with one or more changed variables in the mutually coupled subsidiary presentation.

3. A display, as in claim 1, where one or more array small presentations are mutually coupled to a subsidiary presentation so that a change to any independent variable in the array presentation will visually change the mutually coupled subsidiary presentation in accordance with a dependency relationship among variables, and the user views the mutually coupled subsidiary presentation to determine the dependency relationship.

4. A display, as in claim 1, where a first subsidiary presentation is mutually coupled to a second subsidiary presentation so that a change to any independent variable in the first subsidiary presentation will visually change a visual representation of dependent variables in the second subsidiary presentation in accordance with a dependency relationship among the variables, and the user views the visually changed representation in the second subsidiary presentation to determine the dependency relationship.

5. A display, as in claim 1, where the mutual coupling exists among the array small presentations so that a change to an independent variable observation in any array presentation will visually change coupled array presentations in accordance to a relationship with the changed independent variable observation, whereby the user views the coupled array presentations to determine the relationship.

6. A display, as in claim 1, where an order of the variables in the array presentation can be sorted.

7. A display, as in claim 1, where the mutually coupled subsidiary presentation is accessed by applying criteria to the array presentation.

8. A display, as in claim 7, the criteria including a type of the mutually coupled subsidiary presentation a desired subset of variables, and a desired subset of observation points.

9. A display as in claim 1, having two or more subsidiary presentations, a second subsidiary presentation accessed by applying accessing criteria to a first subsidiary presentation.

10. A display, as in claim 1, having two or more subsidiary presentations, a second subsidiary presentation accessed by applying one or more accessing criteria to a first subsidiary presentation and one or more array small presentations.

11. A display, as in claim 1, with a first array presentation and one or more subsidiary presentations, one or more of the subsidiary presentations being decoupled from all other presentations, whereby the decoupled subsidiary presentations do not visually change when a change is made to the independent variable.

12. A display, as in claim 11, where the decoupled subsidiary presentation is a second array presentation presenting a subset of variables determined from the first array presentation.

13. A display as in claim 1, where the array small presentations include every permutation of two variables, each permutation presented on one array small presentation.

14. A display, as in claim 1, also including presentations of each variable.

15. A method of accessing a second presentation from a first presentation on a computer display by using color comprising the steps of:
   a. brushing a first subset of data points chosen by a first selection criteria with a first color in the first presentation;
   b. accessing the second presentation from the first presentation by using accessing criteria, the accessing criteria being a user selected format of the second presentation and the brushed first subset of data points, the second presentation being mutually coupled to the first,
   whereby a user determines the second presentations to be accessed being those brushed by the first color.

16. A method of mutually coupling a visual first and second presentation on a computer display comprising the steps of:
   a. using the first presentation to create a new parameter value located in a data base related to a variable shown in the first presentation;
   b. accessing the data base by the second presentation to determine the new parameter value;
   c. changing the second presentation based on the new parameter value.

17. A method of mutually coupling a first and second presentation, as in claim 16, where the new parameter is a scale factor.

18. A method of mutually coupling a first and second presentation, as in claim 16, where the parameter is a range of a variable which is to be brushed with a certain color.

19. A method of exploring data using a computer display comprising the steps of:
   a. examining a visual array presentation of small presentations on the display, each small presentation visually showing a relationship among a subset of variables in a data base;
   b. selecting a second subset of observations of one or more variables;
   c. accessing and displaying a first visual subsidiary presentation of data, defined by the selected observation subset and a user selected subsidiary presentation format, the first visual subsidiary presentation being mutually coupled to the array presentation, the mutual coupling between the first visual subsidiary presentation and the array presentation due to one or more dependent variables related to an independent variable so that a change to the independent variable in the first visual subsidiary presentation will visually change all dependent variables in the array presentation in accordance with the relationship among the independent and dependent variables.

20. A method or exploring data, as in claim 19, where a second visual subsidiary presentation is accessed from the first visual subsidiary presentation in order to be displayed on the computer display.

21. A method of exploring data, as in claim 20, where a third visual subsidiary presentation is accessed from the second visual subsidiary presentation.

22. A computer apparatus for exploring data comprising:
   a. a display means for visually displaying an array of small presentations on a visually displayed array;
   b. a selecting means for selecting a subset of observations from the visually displayed array;
   c. a accessing means for accessing and visually displaying subsidiary presentations which are defined by a selected subset of observations and a user selected subsidiary presentation format;
   d. a means for mutually coupling variables from the subsidiary presentation to the array of small presentations, the mutual coupling between the subsidiary presentation and the array of small presentations due to one or more dependent variables related to an independent variable so that a change to the independent variable in the subsidiary presentation will visually change all dependent variables in the array of small presentations in accordance with the relationship among the independent and dependent variables.

23. A computer apparatus for exploring data, as in claim 22, where the accessing means also can display one or more subsidiary presentation progeny and all presentations are mutually coupled by the means for mutually coupling variables.

* * * * *